Oct. 10, 1950     R. R. FINN     2,525,596

OPTICAL PROJECTION SCREEN

Filed Jan. 21, 1949

Inventor
Robert R. Finn
W. O. Moeser Atty.

Patented Oct. 10, 1950

2,525,596

UNITED STATES PATENT OFFICE 2,525,596

OPTICAL PROJECTION SCREEN

Robert R. Finn, Springfield, Vt., assignor to Jones & Lamson Machine Company, Springfield, Vt., a corporation of Vermont Application January 21, 1949, Serial No. 71,809

2 Claims. (Cl. 88—28.93)

My invention relates to optical projection devices, and relates more particularly to an improved projection screen for use with such devices.

My invention may be applied to optical projection systems in general, and will be described herein, by way of example, as applied to an optical comparator of the general type shown in U. S. Patent No. 1,703,933, issued on March 5, 1929, to J. Hartness et al.

The type of inspection apparatus described in the patent referred to is normally provided with a translucent screen on which may be etched or otherwise formed an enlarged representation or outline of a particular object which is to be inspected. By projecting an image of the object on the screen in a well-known manner, a detailed comparison of the object with a master drawing on the screen may readily be made.

The screens upon which the images or silhouettes of the objects under examination are projected must of necessity be translucent in character in order to form an image in a known plane bearing a predetermined spatial relationship with the optical system. This necessary translucency is usually achieved by employing a frosted glass or plastic as the screen material. While such a frosted surface does form the image as desired, it also produces undesirable dispersive effects tending to promote eye strain and inaccurate measurements. This dispersive effect is hereinafter explained more fully and has heretofore never been eliminated in projection screens of which I am aware.

I propose, in accordance with my invention, to provide a second frosted surface similar to and lying in close proximity with the conventional frosted screen now in common use. By moving one frosted surface continuously with respect to the other, I have found that the dispersion causing undesirable glare in the conventional screen is completely eliminated and a soft, white light is produced on the screen. The resulting image can be interpreted much more accurately than has been possible heretofore, and master lines on the screen stand out clearly in the absence of the glare customarily encountered.

It is, accordingly, a principal object of my invention to provide a method for eliminating undesirable dispersive effects produced by screens employed in connection with optical projection apparatus.

It is another object of my invention to provide apparatus for use with a conventional optical projection screen to eliminate the glare therefrom.

It is a further object of my invention to provide an improved screen for use with optical projection apparatus which is inexpensive to construct, and which effectively overcomes the disadvantages of conventional screens of the frosted type.

For a further and more complete understanding of my invention, reference may now be had to the following detailed specification and the drawings; in which.

Figure 1:
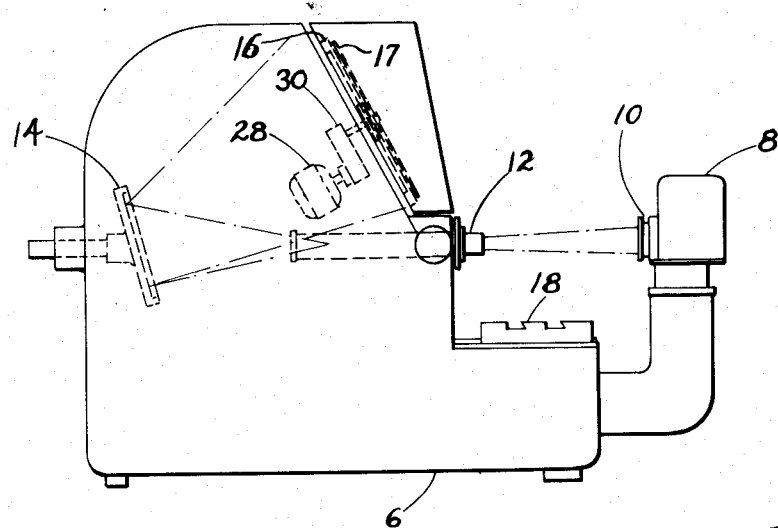
Figure 1 is a schematic representation of a projection device incorporating the invention.

Referring now more particularly to Figure 1, a projection device is shown having a base 6 on which is mounted a lamp housing 8 and collimating lens 10 to provide a source of illumination. An objective lens system 12 and a reflecting mirror 14 cooperate to project light onto the frosted screen 16. An object to be examined (not shown) may be staged on the dovetail slide 18 in the path of collimated light from the lamp. This process of projection is commonly used and is well known in the art.

Figure 5:
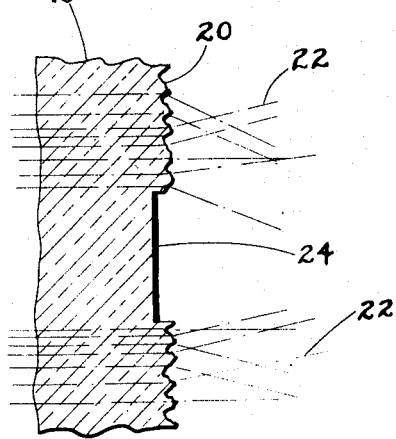
Figure 5 is an enlarged view in section of a conventional frosted screen useful in explaining the invention.

Referring now to Figure 5, a frosted glass screen 16, such as in common use, is shown in cross section highly magnified. The translucent character of the screen and its ability to form an image are produced by the roughened surface 20. This surface is mounted in a known plane to give the desired magnification, and may be produced on glass or similar substance by sand blasting, grinding with a cutting compound, or by other well known methods. As a result, a great many minute prisms are formed which give the over-all effect of translucency and effectively interrupt the light in such fashion as to form an image of an object being examined.

An undesirable effect of these minute prisms is the dispersion of light illustrated by the lines 22. The random light rays coming through the conventional frosted screen produce a glare which is tiring to the eyes of the operator. Furthermore, due to prismatic effects, the light is often broken up into thousands of minute spectra. The over-all impression on the operator is a glaring, uneven surface which has a granular appearance. In Figure 5 an end view of an opaque fiducial line 24 is shown, highly magnified. Because of the effect of all the minute prisms on both sides of the line, it is not perfectly defined for the most accurate measurements. Thus the prismatic effects not only produce undesirable glare but tend to reduce accuracy in the interpretation of images and lines on the screen.

No surface has yet been proposed which will eliminate these effects. Heretofore they have been held to a minimum only by careful control of the grain structure of the surface, with every effort being made to produce a homogeneous surface which has as fine a grain as possible. Nevertheless, such a surface is necessary to form the desired image, and with it all the undesirable effects noted above are produced.

Figure 2:
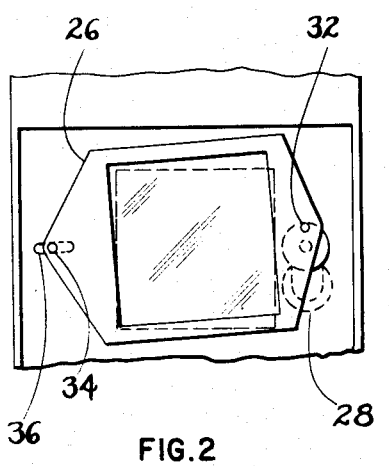
Figure 2 is a front view of the screen of the device shown in Figure 1.
Figure 3:
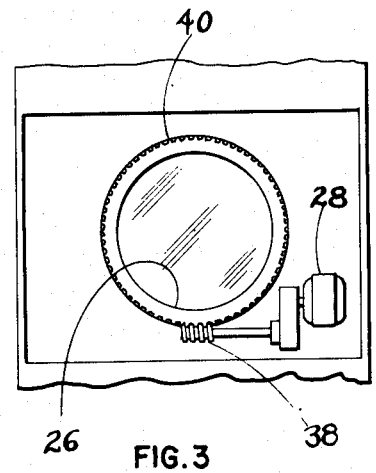
Figure 3 illustrates a modification of the device shown in Figure 2.

I propose to lay over the stationary screen 16 on which the fiducial lines are drawn a second screen 17 having a similar surface. This screen may be held in a suitable frame 26 (Figures 2 and 3) and be kept in a constant state of motion as by a motor 28 operating through a gear reducing unit 30. The screen 17 may be kept in motion through an eccentric connection 32 to the frame 26. A pin 34 in an elongated slot 36 may provide a suitable bearing. An alternative is shown in Figure 3 in which the screen is continuously rotated through a worm gear 38 and ring gear 40 on the frame 26. I prefer circulatory or oscillatory motion in order to keep the minute prisms of the moving screen in constant motion with respect to the minute prisms of the stationary, or master screen 16.

Figure 4:
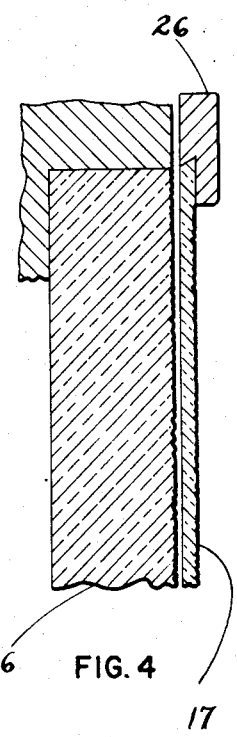
Figure 4 is an enlarged view in section of the projection screen.

The two screens 16 and 17 are shown in cross section, highly magnified, in Figure 4. While I have shown both frosted surfaces facing to the right, they may with equal effectiveness be placed facing each other. In other cases it may be desirable to place the moving screen 17 on the other side of the master screen 16. However, I have generally found it desirable to have the two frosted surfaces as close together as practicable in order to eliminate any projection errors due to the presence of two frosted surfaces. A separation in the order of a few thousandths of an inch is feasible and such a system acts as effectively and accurately as a single screen.

Because of the continuous motion of one screen with respect to the other, the dispersive and refractive pattern is changing continuously. Since the prisms which produce these undesirable effects are exceedingly minute, a relatively slow motion of the screen will result in the pattern changing so rapidly (in the order of hundreds of times per second) that the net effect on the operator's eyes is one of a soft, diffused white light. Not only is eye strain greatly reduced, but fiducial lines on the master screen 16 and the boundaries of the image of an object are much more clearly defined than has heretofore been possible. Therefore, more accurate results may be obtained in the examination, measurement, and interpretation of the image. It may be desirable to cover all moving parts except the frosted surface, so as to produce the effect of a single, stationary screen illuminated with a soft, diffused light.

Having described my invention and the mode of operation thereof, it should be obvious that changes in the construction of a device embodying the invention may readily occur to persons skilled in the art.

I claim:

1. A screen for forming projected images comprising a first frosted surface made up of a random pattern of minute prisms, a second frosted surface substantially identical with said first surface, and in a plane parallel to and in close proximity to said first surface, and means for maintaining continuous relative motion between said surfaces in the planes of said surfaces whereby the composite prismatic pattern of the two screens is in a constant state of rapid change.

2. A screen for forming projected images comprising a first glass screen upon which is ground a random surface pattern of minute surface discontinuities, a second glass screen substantially identical to said first screen and occupying a plane parallel to and in close proximity to said first screen, and means for maintaining continuous relative motion between and in the planes of said screens of sufficient magnitude and speed to change the composite surface pattern presented by the two screens at a rate exceeding that which can be discerned.

ROBERT R. FINN.

REFERENCES CITED

The following references are of record in the file of this patent:

UNITED STATES PATENTS

| Number | Name | Date |
|--------|------|------|
| 1,211,200 | McCormick | Jan. 2, 1917 |
| 1,446,266 | Murray | Feb. 20, 1923 |
| 1,864,946 | Schrago | June 28, 1932 |
| 1,969,909 | Simjian | Aug. 14, 1934 |
| 2,018,214 | Land | Oct. 22, 1935 |
| 2,029,300 | Arfsten | Feb. 4, 1936 |
| 2,087,658 | Shively | July 20, 1937 |
| 2,132,904 | Martinez et al. | Oct. 11, 1938 |
| 2,348,818 | Jacobson | May 16, 1944 |
| 2,371,172 | Hotchner | Mar. 13, 1945 |

FOREIGN PATENTS

| Number | Country | Date |
|--------|---------|------|
| 455,288 | Germany | Jan. 28, 1928 |